(12) United States Patent
Mukavetz et al.

(10) Patent No.: US 7,245,040 B2
(45) Date of Patent: Jul. 17, 2007

(54) SYSTEM AND METHOD FOR CONTROLLING THE FREQUENCY OUTPUT OF DUAL-SPOOL TURBOGENERATORS UNDER VARYING LOAD

(75) Inventors: Dale Mukavetz, Chandler, AZ (US); John K. Harvell, Chandler, AZ (US); Kevin R. Moeckly, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 139 days.

(21) Appl. No.: 11/182,244

(22) Filed: Jul. 15, 2005

(65) Prior Publication Data

US 2007/0013195 A1  Jan. 18, 2007

(51) Int. Cl.
    *F01D 15/10* (2006.01)
(52) U.S. Cl. ............. 290/52; 290/40 C; 290/40 A; 290/40 R; 290/40 B; 322/20; 60/39.02; 60/39.141
(58) Field of Classification Search ............ 290/52, 290/40 C, 40 R, 2, 40 A, 40 B; 322/20; 60/39.02, 39.141
    See application file for complete search history.

(56) References Cited

U.S. PATENT DOCUMENTS

| | | | |
|---|---|---|---|
| 3,663,118 A | 5/1972 | Johnson | |
| 3,937,588 A | 2/1976 | Kisslan | |
| 4,445,046 A * | 4/1984 | Allegre et al. | 290/52 |
| 4,455,614 A * | 6/1984 | Martz et al. | 700/288 |
| 4,471,229 A * | 9/1984 | Plohn et al. | 290/40 R |
| 4,539,810 A | 9/1985 | Watanabe | |
| 4,654,941 A | 4/1987 | Burdette et al. | |
| 4,754,156 A | 6/1988 | Shiozaki et al. | |
| 4,823,018 A | 4/1989 | Kuwabara et al. | |
| 4,989,403 A | 2/1991 | Rodgers | |
| 4,998,949 A | 3/1991 | Cantwell | |
| 5,659,205 A * | 8/1997 | Weisser | 290/52 |
| 5,682,737 A * | 11/1997 | Schmidli | 60/778 |
| 5,704,205 A * | 1/1998 | Hepner et al. | 60/773 |
| 5,794,432 A | 8/1998 | Dunbar et al. | |
| 5,896,736 A | 4/1999 | Rajamani | |
| 6,164,057 A | 12/2000 | Rowen et al. | |
| 6,410,992 B1 * | 6/2002 | Wall et al. | 290/52 |
| 6,442,942 B1 | 9/2002 | Kopko | |
| 6,471,470 B2 | 10/2002 | Yoshimura et al. | |
| 6,542,859 B1 * | 4/2003 | Burns et al. | 703/7 |
| 6,652,414 B1 | 11/2003 | Banks, III | |
| 6,713,892 B2 * | 3/2004 | Gilbreth et al. | 290/52 |
| 6,735,955 B2 | 5/2004 | Mannarino | |
| 6,758,044 B2 | 7/2004 | Mannarino | |
| 6,793,456 B2 | 9/2004 | Kotani et al. | |

* cited by examiner

*Primary Examiner*—Darren Schuberg
*Assistant Examiner*—Iraj A. Mohandesi
(74) *Attorney, Agent, or Firm*—Ingrassia Fisher & Lorenz

(57) ABSTRACT

Methods for maintaining a constant electrical output frequency in a turbogenerator with increased electrical loads are provided. The methods comprise biasing adjustable guide vanes of a compressor and/or a compressor bleed valve in response to the increased electrical load. A dual schedule system for carrying out the methods of the present invention is also provided.

16 Claims, 13 Drawing Sheets

SYSTEM AND METHOD FOR CONTROLLING THE FREQUENCY OUTPUT OF DUAL-SPOOL TURBOGENERATORS UNDER VARYING LOAD

GOVERNMENT RIGHTS

This invention was made with Government support under Contract No. F19628-03-C-0014 awarded by the Air Force. The Government has certain rights in this invention.

BACKGROUND OF THE INVENTION

The present invention relates generally to the operation of gas turbine engines and, more particularly, to a system and method for operation of a gas turbine engine with constant electrical power generation frequency under varying load conditions using compressor variable geometry.

Driving electric generators with gas-turbine engines is well known in the art. When using a single-spool turbine to generate alternating current (AC), the frequency of the AC output will be directly proportional to the rotation rate of the turbine because the generators are connected to the turbine's shaft either directly or through a gear box. Double spool turbines use a separate shaft with its own turbine blades to drive the generator. In either configuration, a problem arises when the load on the generators increases or decreases. A decrease in electrical load causes a drop in torque in the generator and results in the turbine rotating faster. An increase in load causes the turbine to rotate slower. These changes in rotation speed change the frequency of the AC output of the generators, which may be detrimental to the operation of the electrical load.

A number of schemes have been developed to maintain the rotational speed of the turbine with changes in load. Typically, the speed of a turbine is controlled by the amount of fuel supplied to the combustion chamber and the amount of air supplied by the air intake. Air intake is often controlled by adjustable vanes arranged in front of one or more rotating compressor blade rows. The adjustable vanes are rotated to open or closed to adjust the air flow through the various compressor blade rows. A feedback system is generally employed that measures the rotation rate of the turbine shaft, positions the adjustable guide vanes, and sets the fuel flow as needed to maintain a target rotation speed.

For example, U.S. Pat. Nos. 6,735,955 and 6,758,044 disclose a control system for positioning compressor inlet guide vanes using a normal mode schedule and an alternate schedule, where the alternate schedule is used during fast engine acceleration from low engine power. Neither schedule however, is programmed to respond to changes in load during normal operation.

In another example, U.S. Pat. No. 6,164,057 discloses a reserve capacity controller that operates a gas turbine such that a desired reserve power capacity is maintained by using the inlet guide vane angle as an indicator of the reserve levels. The actual inlet guide vane angle is continuously compared to an intended inlet guide vane angle that corresponds to a desired reserve capacity. When the actual inlet guide vane angle differs from the intended inlet guide vane angle, the controller adjusts the fuel flow to the gas turbine to reset the actual inlet guide vane angle.

Such feedback systems suffer from a drawback, however. They generally are unable to respond quickly to sudden large increases in load on the order of hundreds of kilowatts, though they have historically done well with sudden decreases in load. It may take anywhere from 3 to 15 seconds for a typical feedback system to restore a sudden drop in frequency. For some AC applications, this will be an acceptable delay, but for frequency-sensitive applications, this presents a substantial problem.

One such frequency-sensitive application is aircraft electrical power generation. Aircraft electrical power generation requirements become even more demanding with the integration of high power multi-mode phased array radar systems into new or existing aircraft designs. While the radar operation may not be specifically dependent on the frequency of generator output, the power management system and other aircraft components are certainly affected by the wide range of loading levels required by the radar. The multi-mode phased array radar aggravates the frequency problem by randomly switching its operating modes. Each radar mode demands a different power level and thus creates a dynamic loading profile with a wide range of load levels. Operation outside of the required frequency range leads to excessive current levels in generator windings and inaccurate operation of other aircraft electrical components. Therefore, operation below or above target frequency limits demands that the electrical generators be shutdown to prevent electrical damage. However, shutdown of electrical power generation prevents acceptable use of the aircraft. Therefore, an effective aircraft power generation system must be designed to allow rapid, random variation of electrical loads from either the radar or supporting aircraft electrical systems.

What is needed is a system that minimizes frequency variation when exposed to rapid and random load changes which also recovers a desired turbogenerator rotational speed following sudden and substantial changes in electrical load.

SUMMARY OF THE INVENTION

In one aspect of the present invention there is provided a method for controlling the frequency output of a turbogenerator having a turbine engine with compressor variable geometry comprising the steps of sensing an increase in the electrical load of the turbine engine with respect to a steady-state load; supplying a signal to adjustable guide vanes of the turbine engine; and biasing the adjustable guide vanes to a new angle with respect to a steady-state angle in response to the signal, wherein the new angle allows the frequency output to stay above a set minimum level.

In another aspect of the present invention there is provided a method for controlling the frequency output of a turbogenerator comprising the steps of sensing an increase in the electrical load of the turbine engine with respect to a steady-state load; supplying a signal to a compressor bleed valve of the turbine engine; and biasing the compressor bleed valve with respect to a steady-state bias in response to the signal, wherein the new bias allows the frequency output to stay above a set minimum level.

In a further aspect of the present invention there is provided a method for controlling the frequency output of a turbogenerator having a turbine engine with compressor variable geometry comprising the steps of sensing an increase in the electrical load of the turbine engine with respect to a steady-state load; supplying a signal to adjustable guide vanes of the turbine engine; biasing the adjustable guide vanes from about 0° to about 20° with respect to a steady-state angle in response to the signal; supplying a signal to a compressor bleed valve of the turbine engine; and biasing the compressor bleed valve from about 0% to about 15% with respect to a steady-state bias in response to the signal.

In yet another aspect of the present invention there is provided a dual-schedule feedback method for controlling the frequency output of a turbogenerator comprising the steps of sending input signals of a rotational speed of a generator spool of the turbogenerator and atmospheric conditions to a steady-state air flow schedule, wherein the power turbine drives an alternating current generator; generating an output signal from the steady-state schedule to an airflow restriction system to restrict air flow through a gas generator spool causing the gas generator spool to rotate at an elevated rate and wherein the gas generator spool drives the power turbine at a steady-state speed generating a steady-state frequency of generator alternating current output; sensing a droop in the rotational speed of the power turbine with an increase in electrical load and switching from the steady-state schedule to a transient schedule in response to the droop; and generating an output signal from the transient schedule to the airflow restriction system to increase air flow through the gas generator spool wherein the increased air flow decreases the droop in the rotational speed of the power turbine.

In a further aspect of the present invention there is provided a system for controlling the variable positioning of compressor adjustable guide vanes of a turbogenerator comprising a steady-state schedule which schedules relatively closed adjustable guide vane settings resulting in the elevated rotational speed of a gas generator, the gas generator driving a power turbine at a steady-state speed producing a steady-state frequency of generator alternating current output; and a transient schedule which schedules relatively open adjustable guide vane settings with respect to the steady-state schedule during an increased electrical load to the turbogenerator.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Methods for controlling the frequency recovery performance of a turbogenerator upon load increases, as well as a turbogenerator for carrying out the methods of the present invention, are provided. The methods of the present invention use compressor variable geometry as a method of controlling power turbine/electrical generator rotational speed, and therefore frequency, under rapid electrical load changes. The methods and turbogenerator disclosed herein are useful in commercial and military applications where air, land, or seagoing vessels are subject to rapidly changing electrical loads. The present invention may be used in applications where the electrical load changes significantly such as hybrid electrical vehicles, high altitude aircraft supporting radar and other high power consuming technology as well as other hybrid electrical platforms.

The methods described herein may be able, upon application of a large electrical step load, to allow a turbogenerator to recover from the inevitable frequency droop caused by the large increased torque demand more rapidly than now possible in the art. It does so by employing a novel dual-schedule feedback system that increases the angular momentum of a gas generator spool during steady-state operation such that power increase to the power turbine spool to meet increased load demand is accomplished more rapidly than is known in the art. As the power load increases, a signal is sent back to a controller, which controls the compressor variable geometry (CVG) of the turbine engine compressor and/or the compressor bleed valve. Adjustments are then made to the CVG and/or the bleed valve to increase the power available from the gas generator spool, which then increases the power to the power turbine spool, thus limiting the speed droop experienced by the electrical generators. The adjustments are made within a fraction of a second so the engine frequency does not fall below a minimum level. Methods disclosed the prior art focus on improved acceleration of the gas generator spool of a gas turbine engine, but do not adjust for increased electrical loads or demands.

Figure 1:
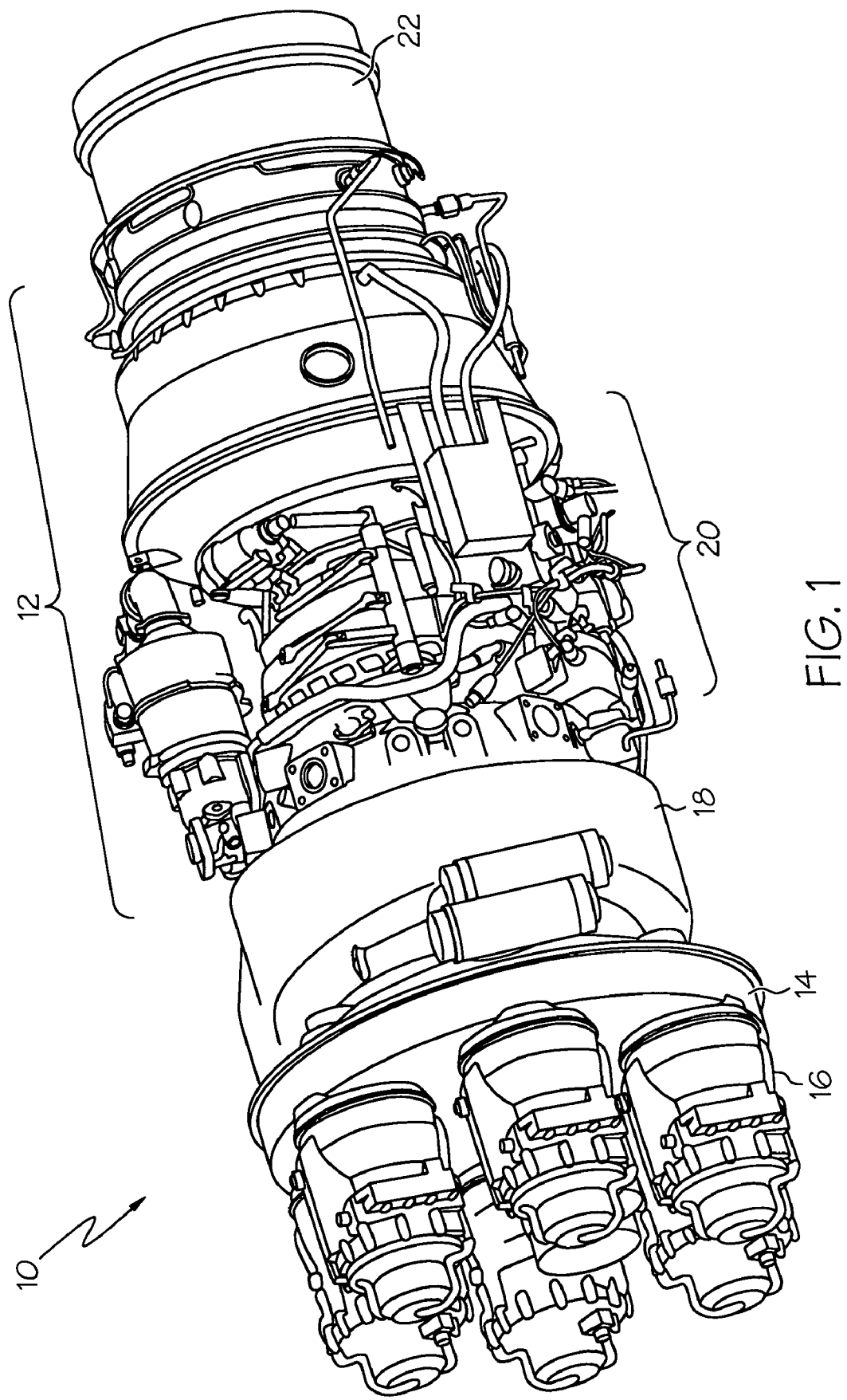
FIG. 1 is a perspective view of a turbogenerator according to the invention.

Referring to FIG. 1, there is shown a turbogenerator 10 comprising a turbine engine 12, a generator 16 and a gearbox 14 connecting turbine engine 12 to generator 16. Turbine engine 12 may have an air intake manifold 18 wherein air may be drawn into a compressor 20, combined with fuel and burned, providing exhaust gases which may be discharged out an exhaust port 22.

Figure 2:
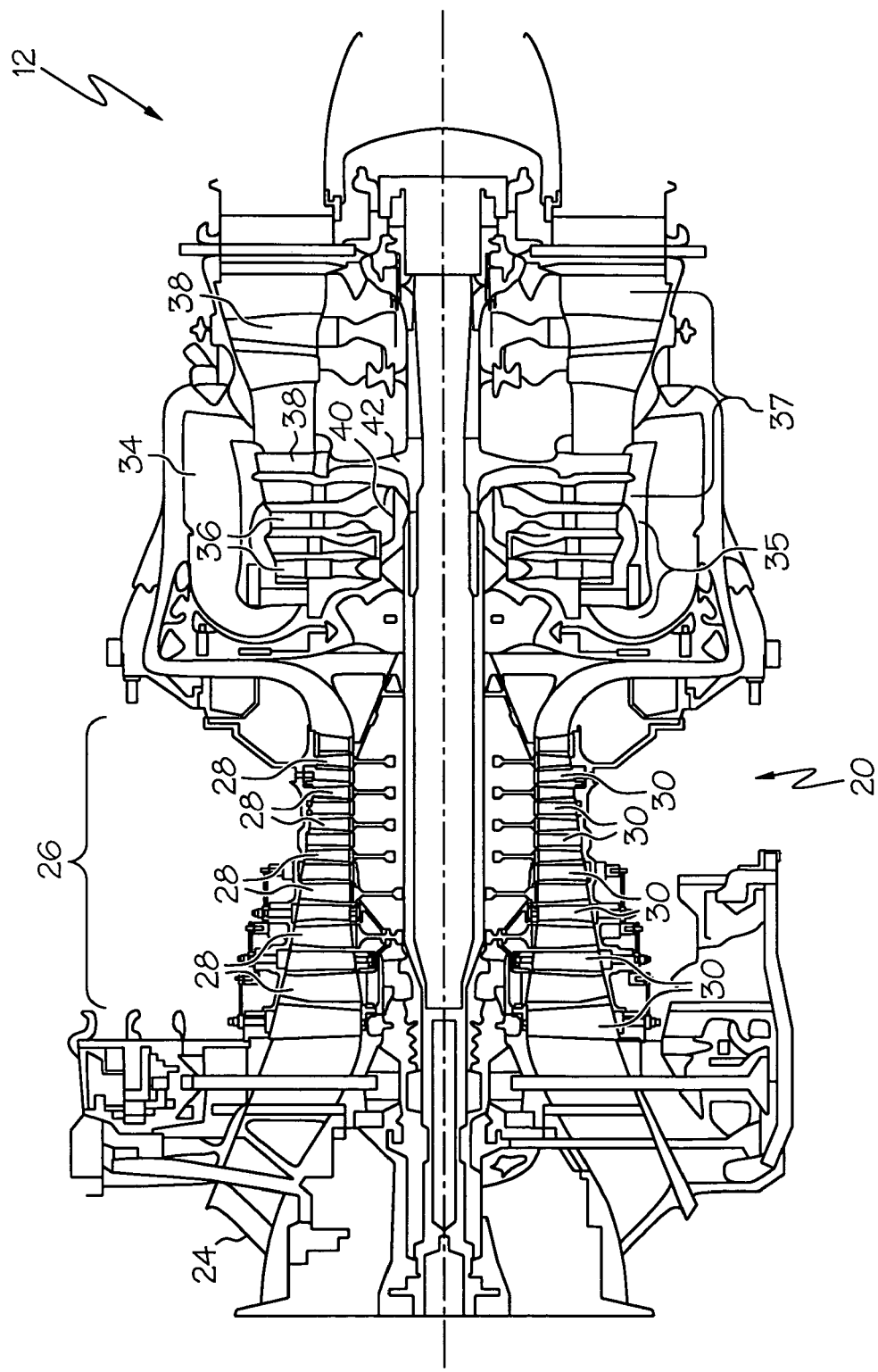
FIG. 2 is a cross-sectional view of a gas turbine engine of the turbogenerator of FIG. 1 according to the invention.
Figure 3:
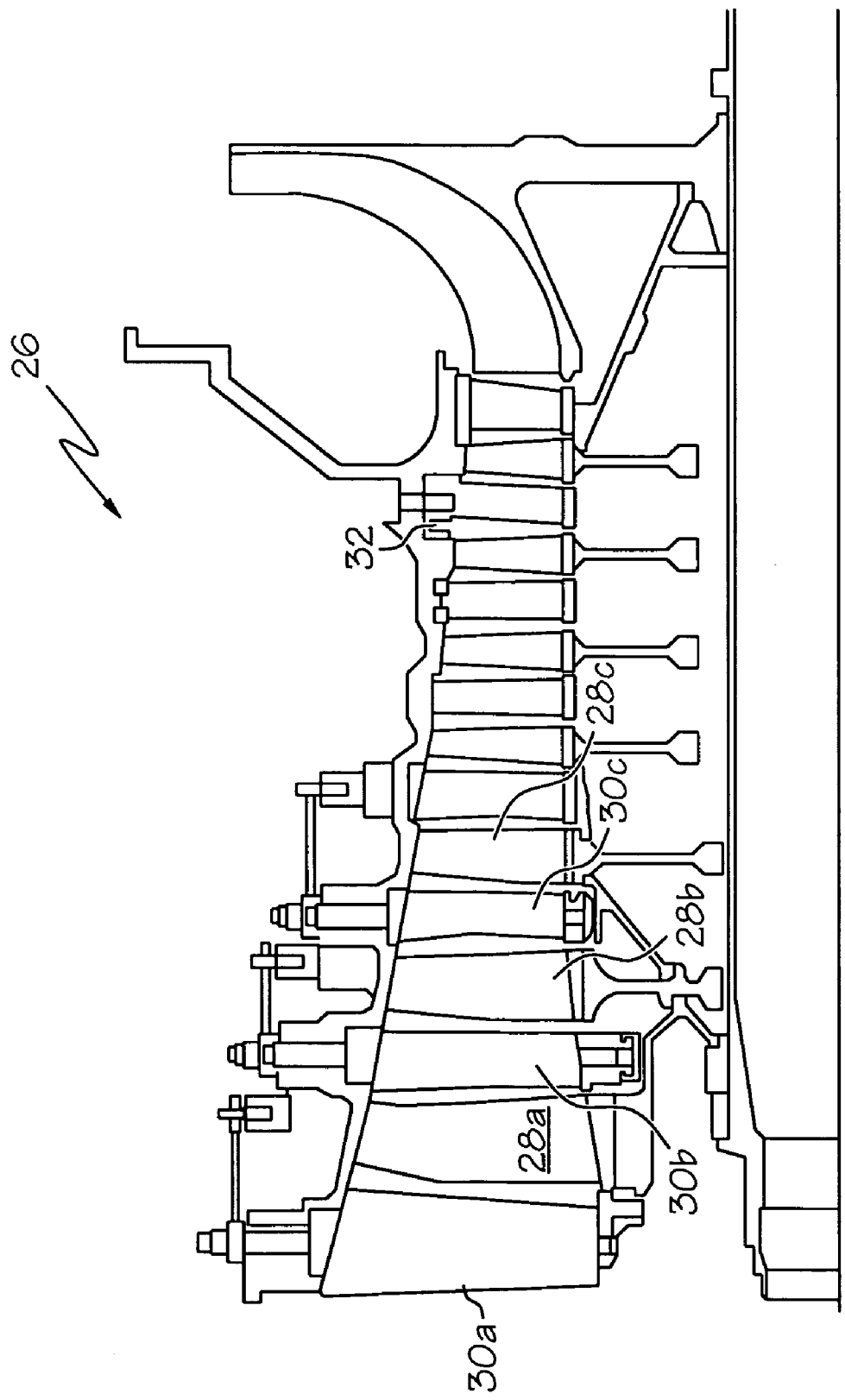
FIG. 3 is an expanded cross-sectional view of the compressor of the gas turbine engine of FIG. 2.

FIG. 2 shows a cross-section of turbine engine 12. Air from intake manifold 18 (see FIG. 1) may enter an air inlet 24 and then into compressor 20, passing through one or more stages 26. In the non-limiting example shown in FIG. 2, compressor 20 may have seven stages 26 of axial compression followed by a single stage centrifugal compressor 27. In another non-limiting example, compressor 20 may have from about 1 to about 18 stages 26. Each axial stage may be represented by a single row of vanes 30 and a single row of rotating blades 28. The front three rows of rotating blades, 28a, 28b, 28c of compressor 20 may have corresponding rows of guide vanes 30a, 30b 30c that are adjustable. (See FIG. 3). Adjustable guide vanes 30a, 30b, 30c may permit a variable geometry in what is referred to as the compressor variable geometry (CVG). The remaining vanes may be fixed, commonly referred to as "stator vanes".

Adjustable guide vanes 30a, 30b, 30c may be rotated to various positions to adjust air flow through the downstream stages of compressor 20, the positions ranging from closed, which reduces airflow to a minimum, to open where airflow through the machine achieves the maximum design intent. Although the non-limiting example shown in FIGS. 2 and 3 has three adjustable guide vanes 30a, 30b and 30c, the number of rows of adjustable guide vanes may vary from about 1 to about 7.

Figure 6:
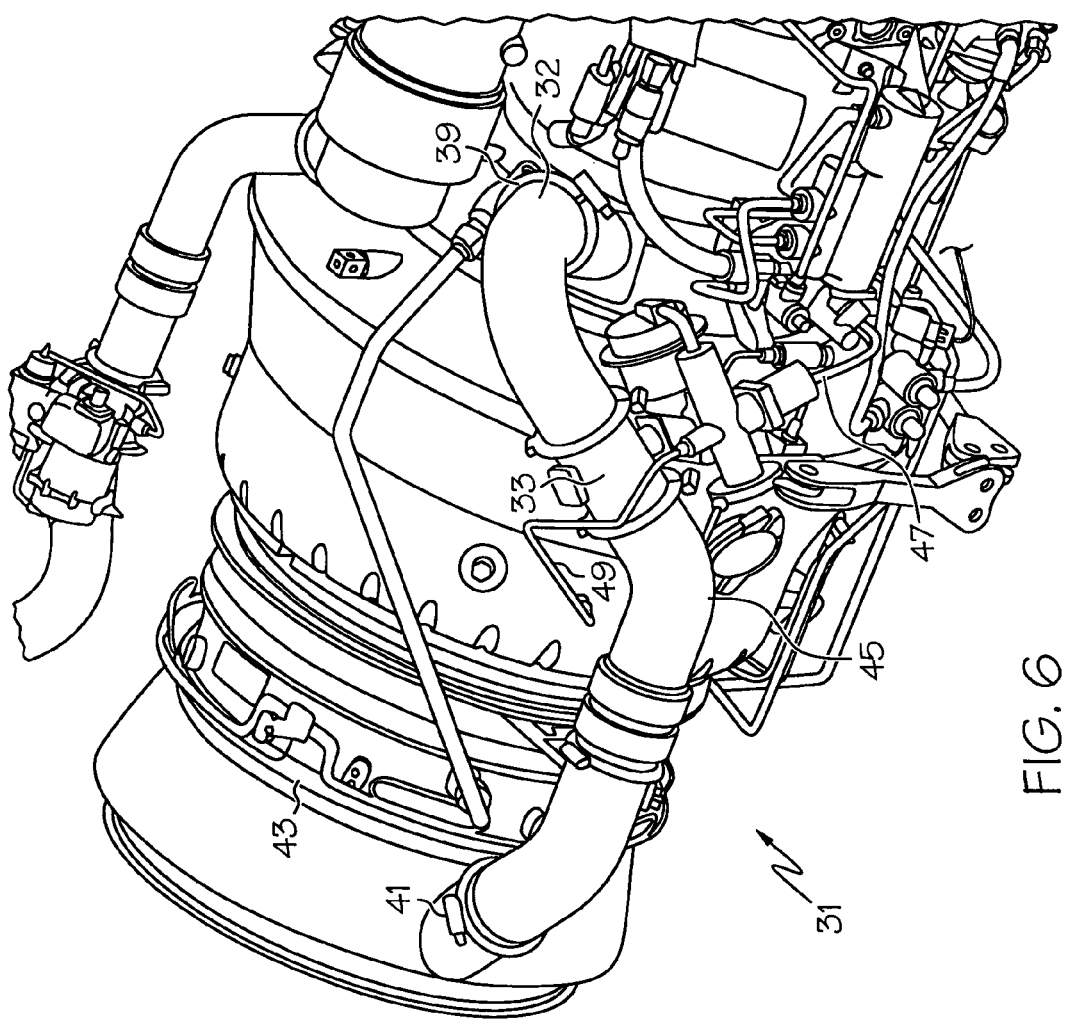
FIG. 6 is a perspective view of a turbine engine showing a bleed system, according to the invention.

Compressor 20 may further comprise at least one bleed port 32, located in the non-variable compressor stages. Bleed port 32 may be part of a bleed system 31 as shown in FIG. 6. Bleed system 31 may comprise a bleed port housing 39 for securing one end of a bleed duct 45 to compressor 20. Bleed system 31 may also comprise a bleed valve 33 inserted into bleed duct 45. The other end of bleed duct 45 is secured to a bleed system exhaust plenum 43 through a tailpipe interface 41. An electrical connection 47 may connect bleed valve 33 with an electrical control unit (not shown) which may control the biasing of bleed valve 33. Bleed system 31 may further comprise a muscle air line 49 which may provide the motive force causing actuation of the bleed valve 33.

Bleed port 32, controlled by bleed valve 33, may allow compressed air passing through the compressor to be bled out of the engine through bleed duct 45 to bleed system exhaust plenum 43 to reduce air flow in downstream stages while maintaining airflow in upstream stages. Bleed valve 33 may be a full-opened/full-closed type valve, meaning it only has two positions, fully opened or fully closed. Alternatively, bleed valve 33 may be a variable valve so as to permit continuous adjustment of the bleed between the fully closed and fully open position.

Turbine engine 12 may further comprise a combustion chamber 34, where fuel, mixed with air from compressor 20, may be combusted and a high pressure turbine 35 and a low pressure turbine 37, which accept the exhaust gases resulting from fuel combustion in combustion chamber 34. When the hot exhaust gases reach high pressure turbine 35, they may pass through high pressure turbine blades 36, causing the rotation of a gas generator shaft 40. The compressor 20, rotating blades 28 and vanes 30, gas generator shaft 40, and high pressure turbine blades 36 may be collectively referred to as the gas generator spool. Gas generator shaft 40 may communicate the power extracted by high pressure turbine 35 to compressor 20. The hot exhaust gases may also pass through low pressure turbine blades 38 in low pressure turbine 37. The low pressure turbine 37, through low pressure turbine blades 38, may be used to extract power from the exhaust gas which is then communicated through a power turbine shaft 42 to gearbox 14 of FIG. 1. This combination of low pressure turbine blades 38 and power turbine shaft 42 may be referred to collectively as the power turbine spool. Finally, gearbox 14 may then communicate the power of the power turbine spool through the associated gear train (not shown) to the generator(s) 16. (See FIG. 1).

The efficiency of fuel utilization and the power produced may be controlled by biasing the rows of adjustable guide vanes 30a, 30b, 30c of variable geometry stage 26. Biasing adjustable guide vanes 30a, 30b, 30c toward a more open position may allow for more air (i.e. oxygen) to flow through compressor 20, to mix with the fuel during the combustion process, thereby increasing power production at a specific gas generator spool speed. Conversely, biasing toward a more closed position may allow for decreased power production at the same gas generator speed.

Figure 4:
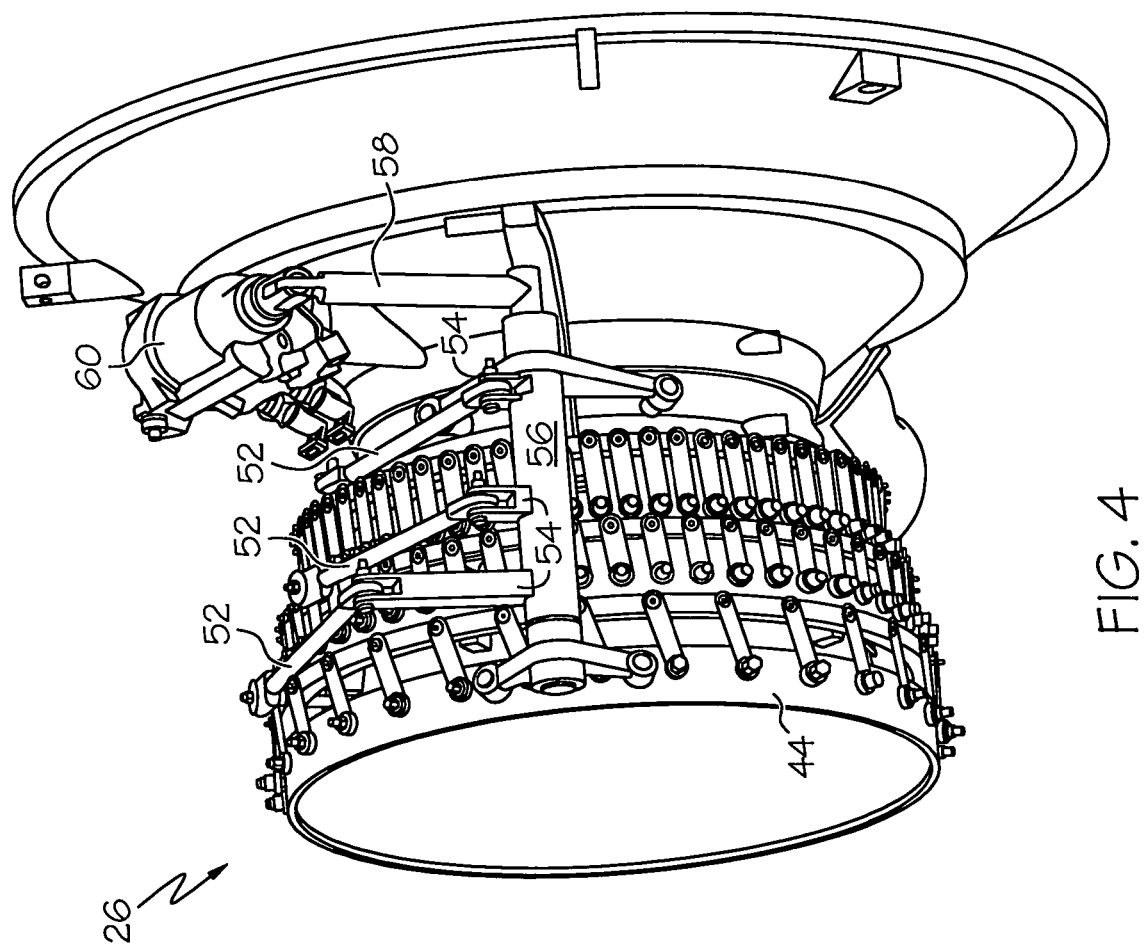
FIG. 4 is a perspective view of a compressor of the gas turbine engine of FIG. 1, according to the invention.
Figure 5:
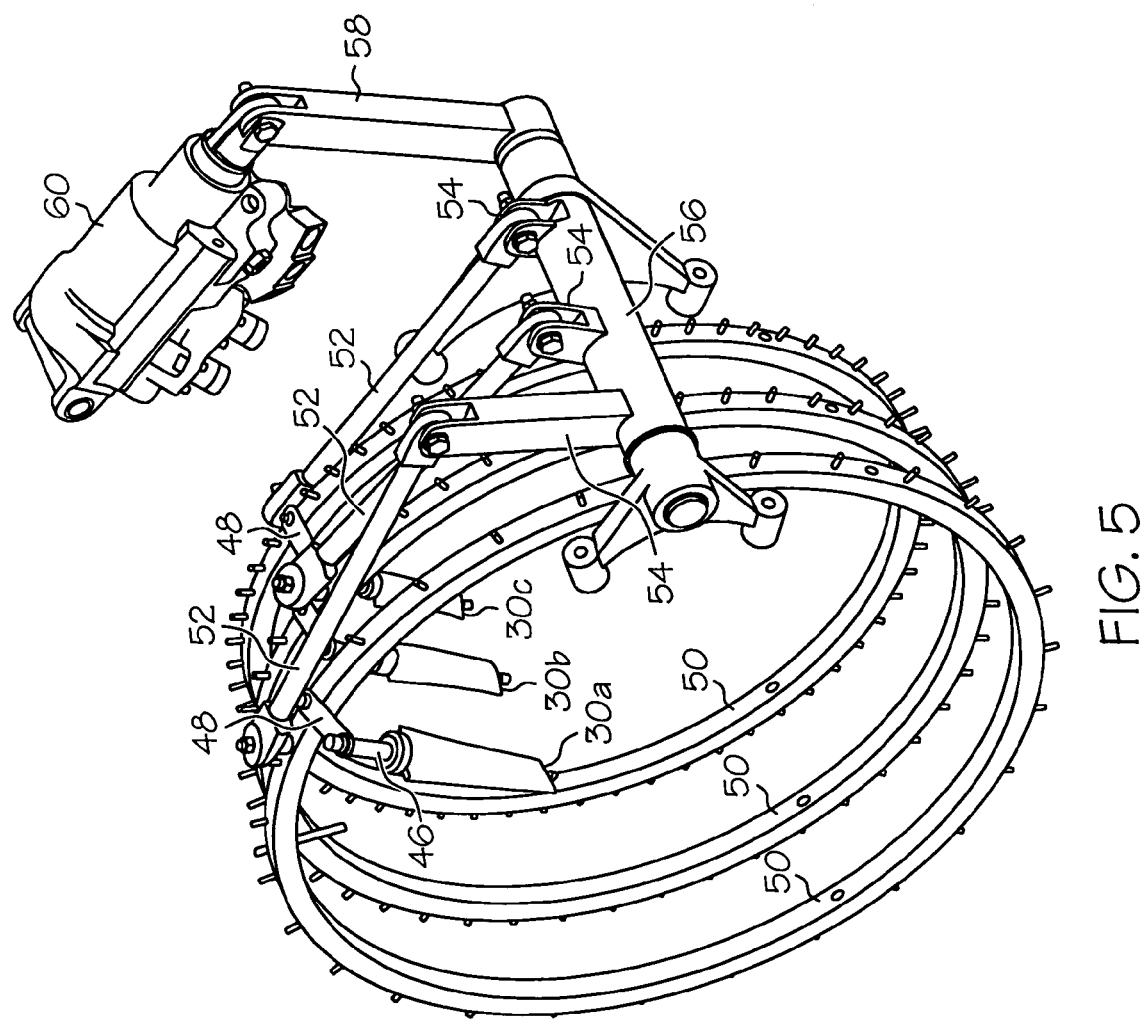
FIG. 5 is a perspective view of the guide vane mechanism of the compressor of FIG. 4, according to the invention.

Referring to FIGS. 4 and 5, there is shown a close up of variable geometry stage 26 of compressor 20. Each adjustable guide vane 30a, 30b, 30c (see FIG. 5) may be rotatably mounted to an outer casing 44 by a vane shaft 46 fixedly attached to a vane lever 48. An actuator ring 50 may be rotatably mounted around outer casing 44 and pivotedly connected to each vane lever 48. When actuator rings 50 are rotated, vane levers 48 may open or close the adjustable guide vanes 30a, 30b, 30c depending on which direction actuator rings 50 are rotated about the casing 44. While only one adjustable guide vane 30a is shown on each actuator ring 50 for clarity, it is contemplated that there may be a plurality of adjustable guide vanes radially disposed around the actuator ring 50. By way of a non-limiting example, there may be from about 15 to about 100 adjustable guide vanes on each actuator ring 50.

As can be seen, the non-limiting example shown in FIG. 5 may have three actuator rings 50 for opening and closing three sets of adjustable guide vanes 30a, 30b, 30c. The number of actuator rings 50, and thus the number of adjustable guide vanes, may vary from model to model of turbine engine. The number of actuator rings may be from about 1 to about 7. In general, one actuator ring is used for each row of variable vanes used in the compressor. The number of variable vane rows is generally driven by compressor stage matching requirements and their associated costs. The plurality of actuator rings 50 may be caused to rotate by an actuator tie rod 52, where each actuator tie rod 52 may be connected to an actuator arm 54 of a rotatably mounted actuator shaft 56. The actuator shaft 56 may be caused to rotate by a guide vane actuator 60 via an actuator shaft lever 58.

Figure 7:
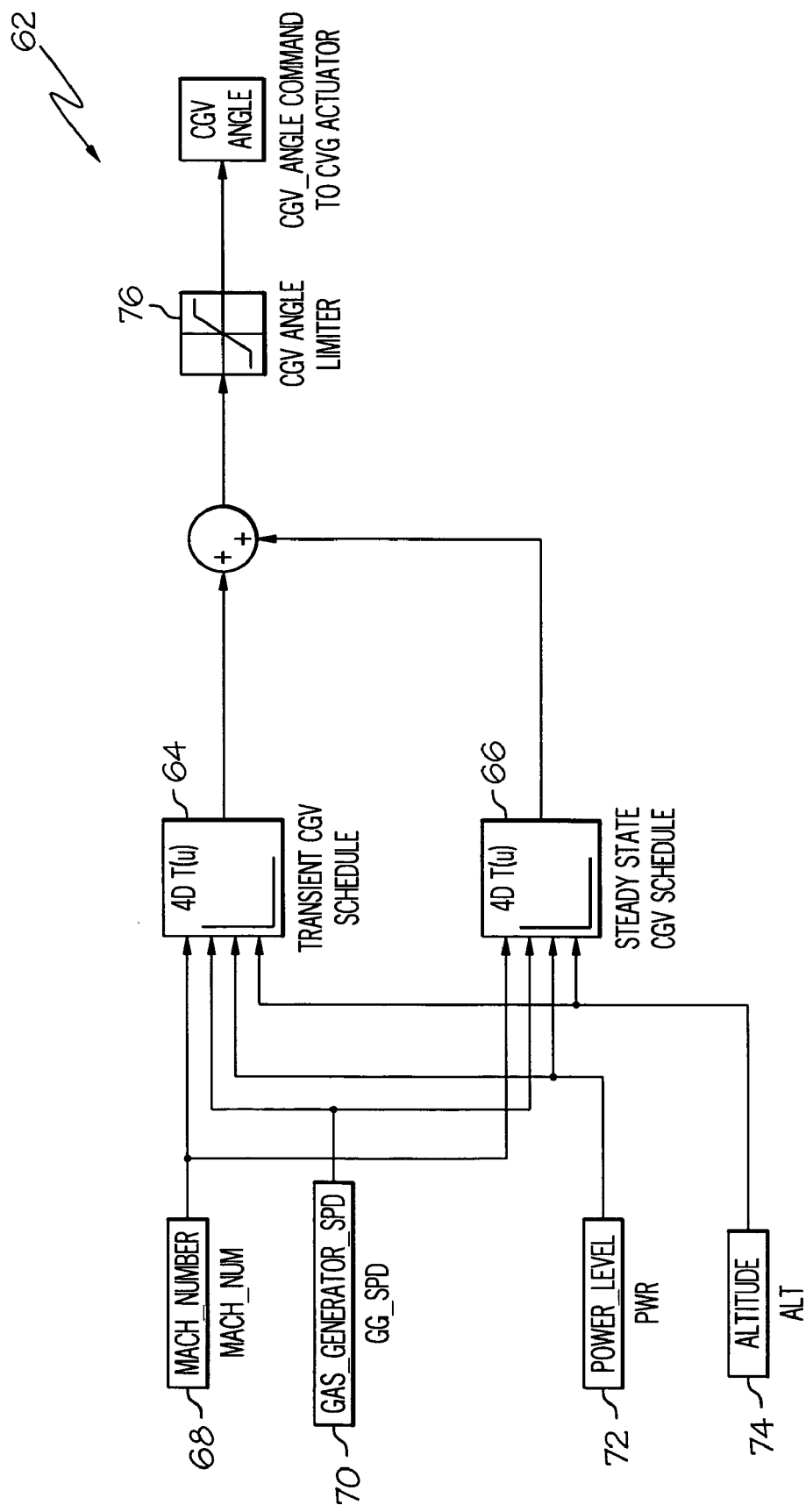
FIG. 7 is a schematic diagram of a frequency recovery feedback system, according to the invention.

Referring to FIG. 7, there is shown a dual-schedule feedback system 62 of the invention, which comprises a steady-state schedule 66 and a transient schedule 64. Generally, feedback control systems for turbines may utilize a steady-state schedule 66 of values for the guide vane angles based on a number of input variables, such as airspeed input 68, gas generator spool speed input 70, generator power level input 72 and altitude input 74. These factors, as well as ambient temperature, affect the response of turbogenerator 10 to an increase in electrical load. Steady-state schedule 66 may be an array of values stored on a machine-readable medium that determine the initial compressor variable geometry pre-positioning, where the compressor variable geometry is set before turbine engine 12 operation. Compressor variable geometry pre-positioning as a function of aircraft operation conditions such as airspeed, altitude and ambient temperature and the existing power load may optimize the turbogenerator's 10 ability to provide current power needs and prepares the engine to accept sudden electrical load changes without significant change of generator speed and therefore output frequency. Steady-state schedule 66 may constantly adjust the compressor variable geometry to optimize turbogenerator 10 operating condition for relatively slow load changes, i.e. one second or greater.

Transient schedule 64 may utilize the same input values as steady-state schedule 66, but may also receive a real-time load signal, telling transient schedule 64 what is expected of turbine engine 10 upon large and rapid electrical load demands. In one illustrative embodiment, the load demand may increase from about 250 kW to about 600 kW. Conversely, in an alternate illustrative embodiment, the load demand may decrease from about 600 kW to about 250 kW. The output of the currently executing schedule may go through a vane angle limiter 76 which communicates with guide vane actuator 60 to adjust the adjustable guide vanes 30a, 30b, 30c to the desired angle to either increase or decrease airflow into combustion chamber 34. Once at the desired angle, the modified airflow may adjust gas generator spool speed 70 within fractions of a second such that electrical frequency output does not fall below a minimum. In one illustrative embodiment, adjustable guide vanes 30a, 30b, 30c are adjusted in a time frame of from about 0.1 sec to about 2.0 sec. Vane angle limiter 76 may also ensure that the guide vane actuator 60 does not exceed its physical capabilities.

The alteration in adjustable guide vane angle may be referred to as the guide vane angle bias. For example, if adjustable guide vanes 30a, 30b, 30c are biased by 15°, the adjustable guide vanes 30a, 30b, 30c may be rotated toward the closed position 15° from the angle they were initially set at. By way of non-limiting example, the adjustable guide vanes 30a, 30b, 30c may be biased from −2° to +50°, the latter representing the most closed angle. In another non-limiting example, adjustable guide vanes 30a, 30b, 30c are biased from about 0° to about 20°. In a further non-limiting example, adjustable guide vanes 30a, 30b, 30c are biased ±10°. The optimal values for the bias may vary from engine model to engine model and will be known by the skilled artisan.

Note that the slew rate of the adjustable guide vanes may have an effect. In an illustrative embodiment, the slew rate of the adjustable guide vanes may be no greater than 38° per second. However, it will be appreciated that the slew rate depends on the actuation system being used in the present invention. A more responsive actuation system can handle faster slew rates than a less responsive system.

Figure 8:
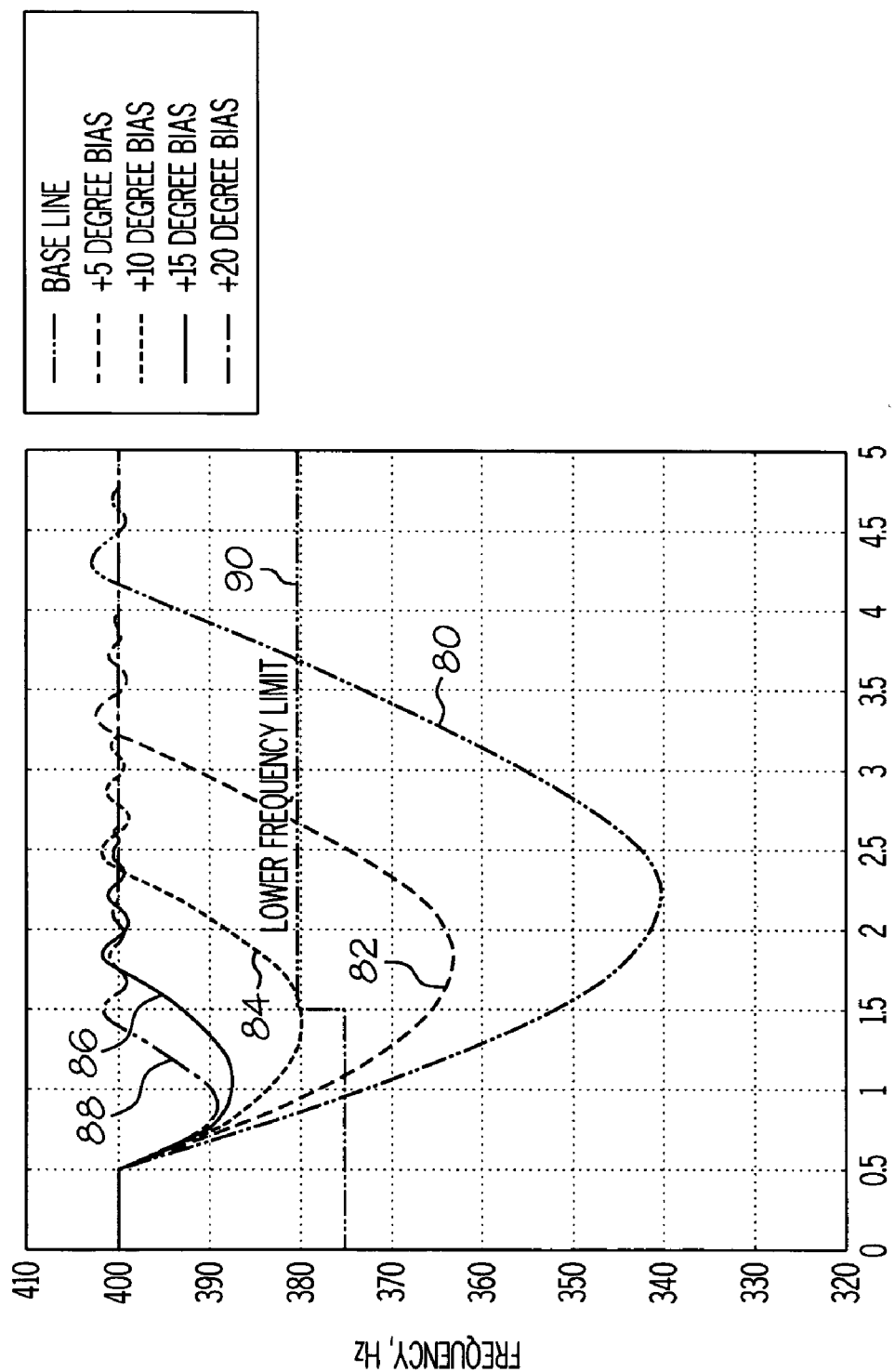
FIG. 8 is a graph of the effect of biasing a compressor variable geometry in response to increased load on the frequency recovery performance of a turbogenerator, according to the invention.

The effect of biasing the adjustable vane guides 30a, 30b, 30c on output frequency after a sudden increase in electrical load is shown in FIG. 8. A large frequency droop is observed in the baseline curve 80 (no bias) when the electric load is increased from 250 kW to 600 kW in 0.33 msec. The primary cause of the frequency droop when step load increases occur is the finite period of time required for the gas generator to accelerate prior to being able to support the higher load level. During the transition period, power turbine speed droops due to the torque imbalance of the system. As shown in FIG. 8, a reduction of frequency droop is observed concomitant with increasing bias of adjustable guide vanes 30a, 30b, 30c under conditions of an altitude of 39,000 feet, 0.66 Mach speed and a 10% hot day (where a 10% hot day references a temperature condition as reflected in MIL-HDBK-310 titled, "Global Climatic Data For Developing Military Products"). Although a 5° bias 82 reduces the frequency, it does not reduce it to above a lower frequency limit 90. A 10° bias 84, 15° bias 86 or 20° bias 88 however, does reduce the frequency droop to a level above lower frequency limit 90.

Generally, it may be desirable to have the output frequency of the generator drop no more than about 1.7% to 1.9% for every 100 kW of a step increase in electrical load for the first second, no more than about 1.4% to 1.5% for the following 4 seconds, no more than about 0.6 to 0.8% for the following 5 seconds, and no more than about 0.4% to 0.6% for the next 5 seconds. Full recovery to the target output frequency may occur within 15 seconds after application of the step load.

Much like the transient CGV bias method, the use of transient compressor bleed system bias may be targeted at increasing gas generator speed to allow rapid recovery of power frequency output through modulation of bleed valve 33 (see FIG. 6). A transient compressor bleed bias may be used and at lower steady-state power levels, bleed valve 33 may be opened to a specified bleed amount. This specified bleed amount may be a function of altitude and steady-state power frequency output levels. With an increase in electrical load, a real-time load change may be communicated to a transient schedule, such as transient schedule 64, which may then slew bleed valve 33 closed, while a speed governor (not shown) may respond to the frequency output droop by adding fuel. The bleed valve 33 may be, but not limited to, a full-opened/full-closed type bleed valve or a modulating bleed valve. There may be one bleed valve 33 or there may be a plurality of bleed valves 33. If there is a plurality of bleed valves 33, the total desired bias may be a sum of the biases for individual bleed valves 33. The bias of the bleed valve 33 may be expressed as a percentage. In one non-limiting example, a 5% bias in the bleed valves may translate into a 5% increase in the mass flow of air that is being bled out with respect to steady-state amounts of air flowing through the compressor 20. In an illustrative embodiment, the compressor bleed valve 33 is biased from about 0% to about 15% with respect to a steady-state bias.

Figure 9:
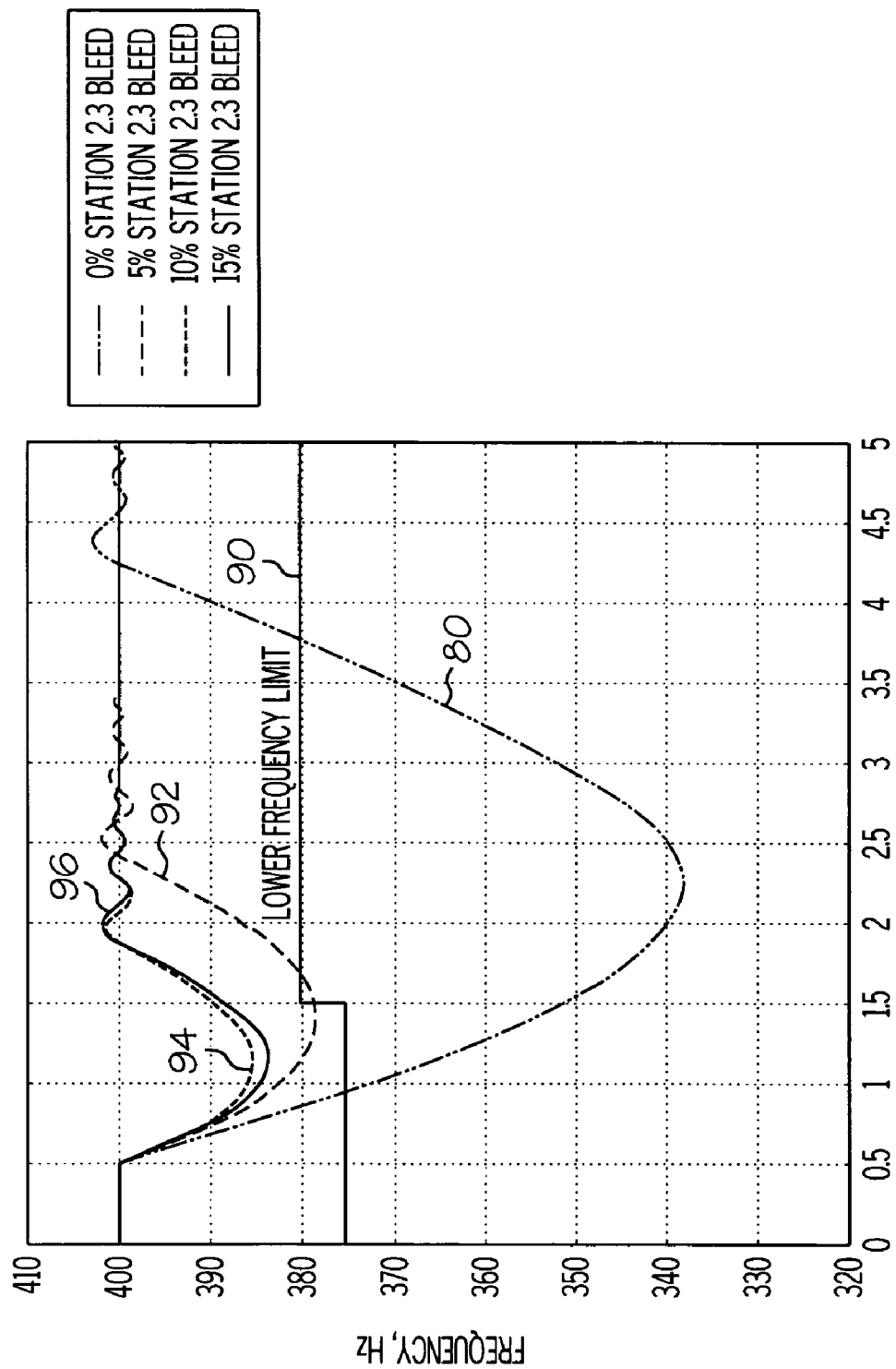
FIG. 9 is a graph of the effect of compressor bleed bias in response to increased load on the frequency recovery performance of a turbogenerator, according to the present invention.

The effect of biasing the bleed valve 33 on output frequency after a sudden increase in electrical load is shown in FIG. 9. A large frequency droop is observed in the baseline curve 80 (no bias) when the electric load is increased from 250 kW to 600 kW in 0.33 msec. As shown in FIG. 9, a reduction of frequency droop is observed concomitant with increasing bias of the bleed valve 33 under conditions of an altitude of 39,000 feet, 0.66 Mach speed and a 10% hot day. Biasing the bleed valve 33 may provide an effective means of controlling the transient frequency response. However, there may be an optimum bleed level or bias. When this optimum bias is exceeded, the system transient response may deteriorate rather than continuing to improve. The optimum under the conditions of FIG. 9 appears to lie between a 5% bias curve 92 and a 15% bias curve 96. In fact, the 15% bias curve appears to have a slightly less favorable response that a 10% bias curve 94. These values may further be compared to the baseline curve 80, where there is no bias, and the lowest frequency limit 90.

Biasing of the compressor variable geometry or compressor bleed bias may each be used independently to control the frequency response of turbogenerator 10 when subjected to an increased electrical load. However, there may some advantages to biasing the compressor variable geometry as compared to biasing the compressor bleed.

Figure 10:
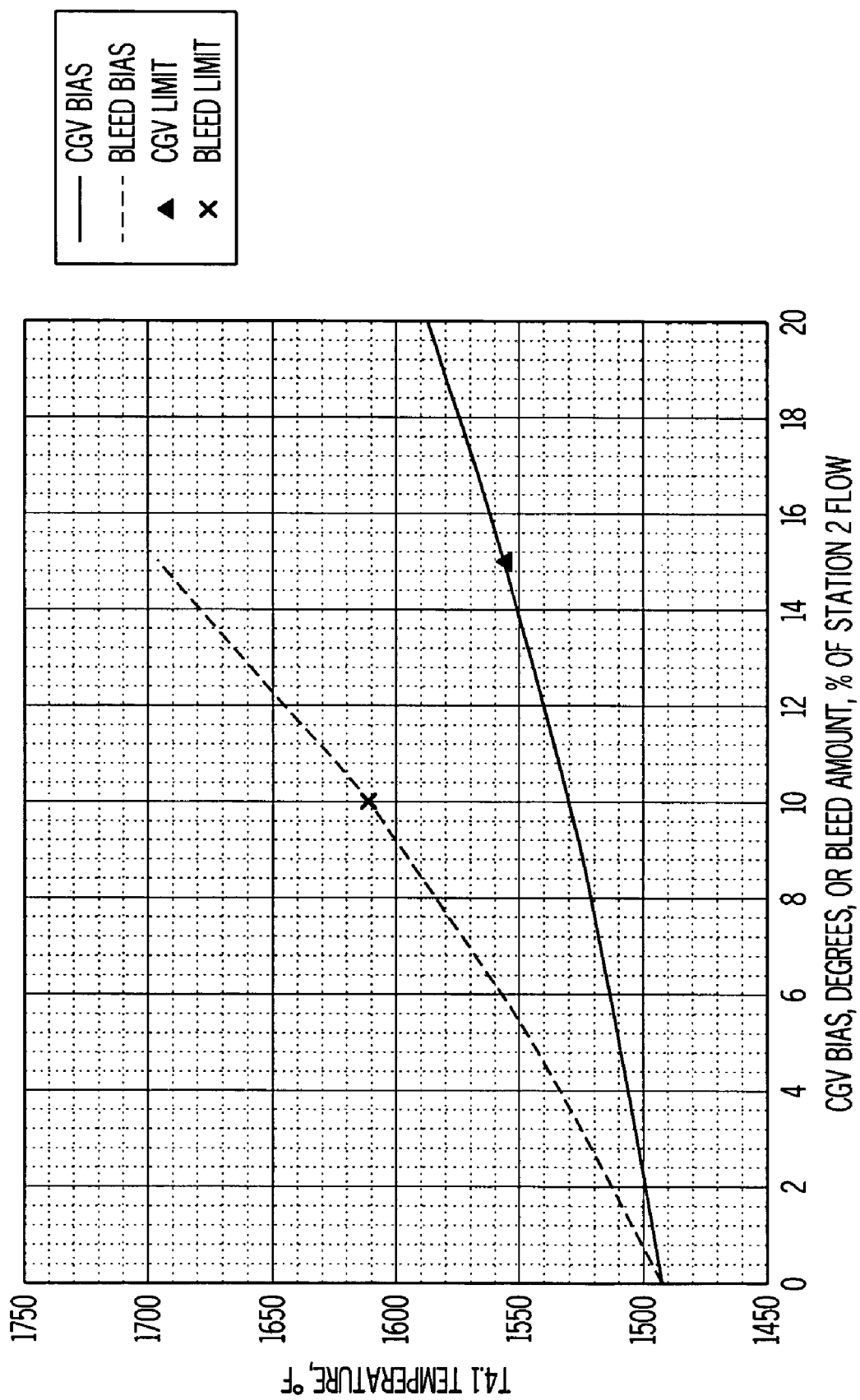
FIG. 10 is a graph showing the effect of either compressor variable geometry bias or compressor bleed bias on the steady state turbine inlet temperature of a turbogenerator, according to the invention.
Figure 11:
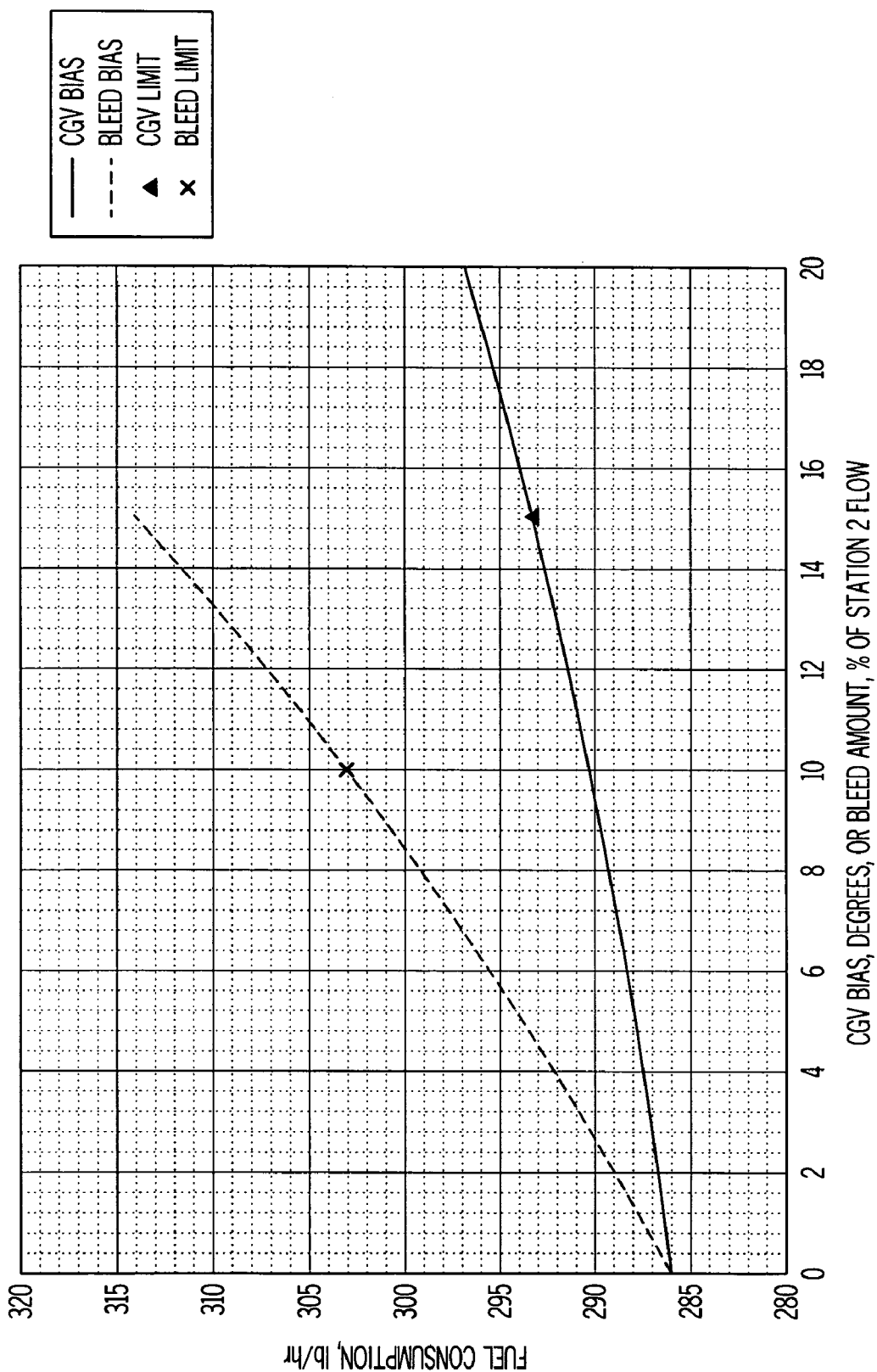
FIG. 11 is a graph showing the effect of compressor variable geometry bias and compressor bleed bias on the fuel consumption of a turbogenerator, according to the present invention.

FIGS. 10 and 11 compare the effect of biasing either the compressor variable geometry or the compressor bleed on either the operating temperature of turbine engine 12 or fuel consumption, respectively. In both cases, biasing the compressor variable geometry has much less effect on both temperature and fuel consumption than biasing the compressor bleed. Alternatively, biasing of the compressor variable geometry and the compressor bleed may both be used to control the power frequency output.

In a dual spool turbogenerator system, reduction of airflow can be used to increase rotational speed of the gas generator spool during steady-state operation at any given power turbine spool speed. Upon sudden application of a step-load, removal of the restriction on airflow in combination with a fuel flow increase allows for rapid frequency recovery in the generator output by a combination of the sudden increase in air mass and the sudden increase in combustion energy than would otherwise have been possible using the standard air flow and throttle schedule. This is made possible because the gas generator turbine is already at an elevated speed so a substantial portion of the time that would otherwise be needed to accelerate the gas generator spool to a higher level is eliminated.

Figure 12:
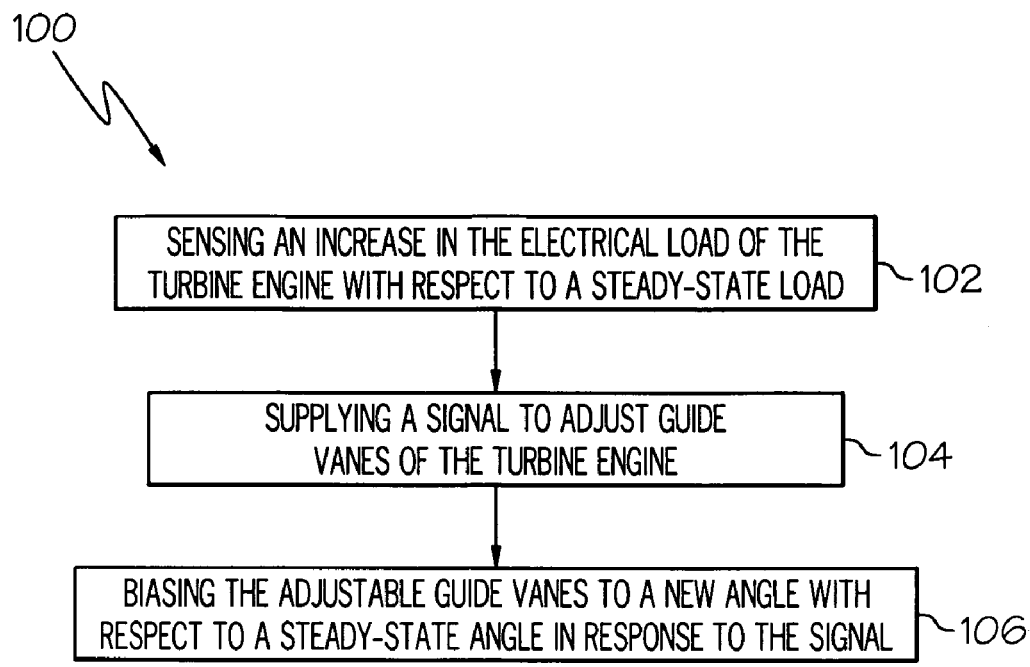
FIG. 12 is a flow chart of a method of controlling the frequency output of a turbogenerator according to one embodiment of the present invention.

Referring to FIG. 12, method 100 of controlling the frequency output of a turbogenerator may comprise step 102 of sensing an increase in the electrical load of the turbine engine with respect to a steady-state load and step 104 of supplying a signal to adjustable guide vanes of the turbine engine. Method 100 may further comprise step 106 of biasing the adjustable guide vanes to a new angle with respect to a steady-state angle in response to the signal, wherein the new angle allows the frequency output to stay above a set minimum level.

Figure 13:
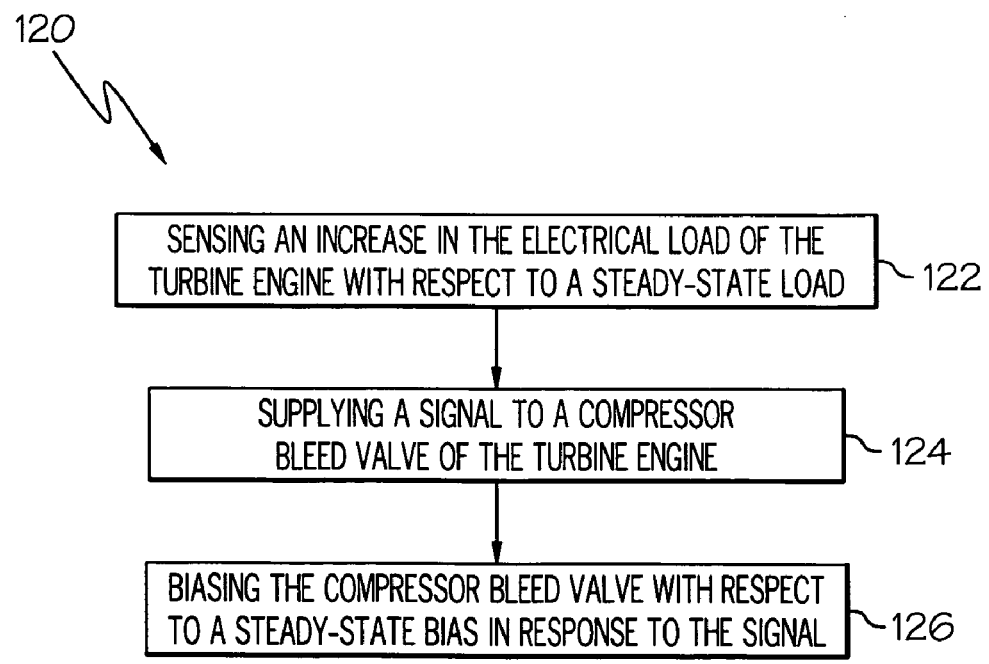
FIG. 13 is a flow chart of a method of controlling the frequency output of a turbogenerator according to another embodiment of the present invention.

Method 120 for controlling the frequency output of a turbogenerator is illustrated in FIG. 13. Method 120 may comprise step 122 of sensing an increase in the electrical load of the turbine engine with respect to a steady-state load, step 124 of supplying a signal to a compressor bleed valve of the turbine engine, and step 126 of biasing the compressor bleed valve with respect to a steady-state bias in response to the signal, wherein the new bias allows the frequency output to stay above a set minimum level.

Figure 14:
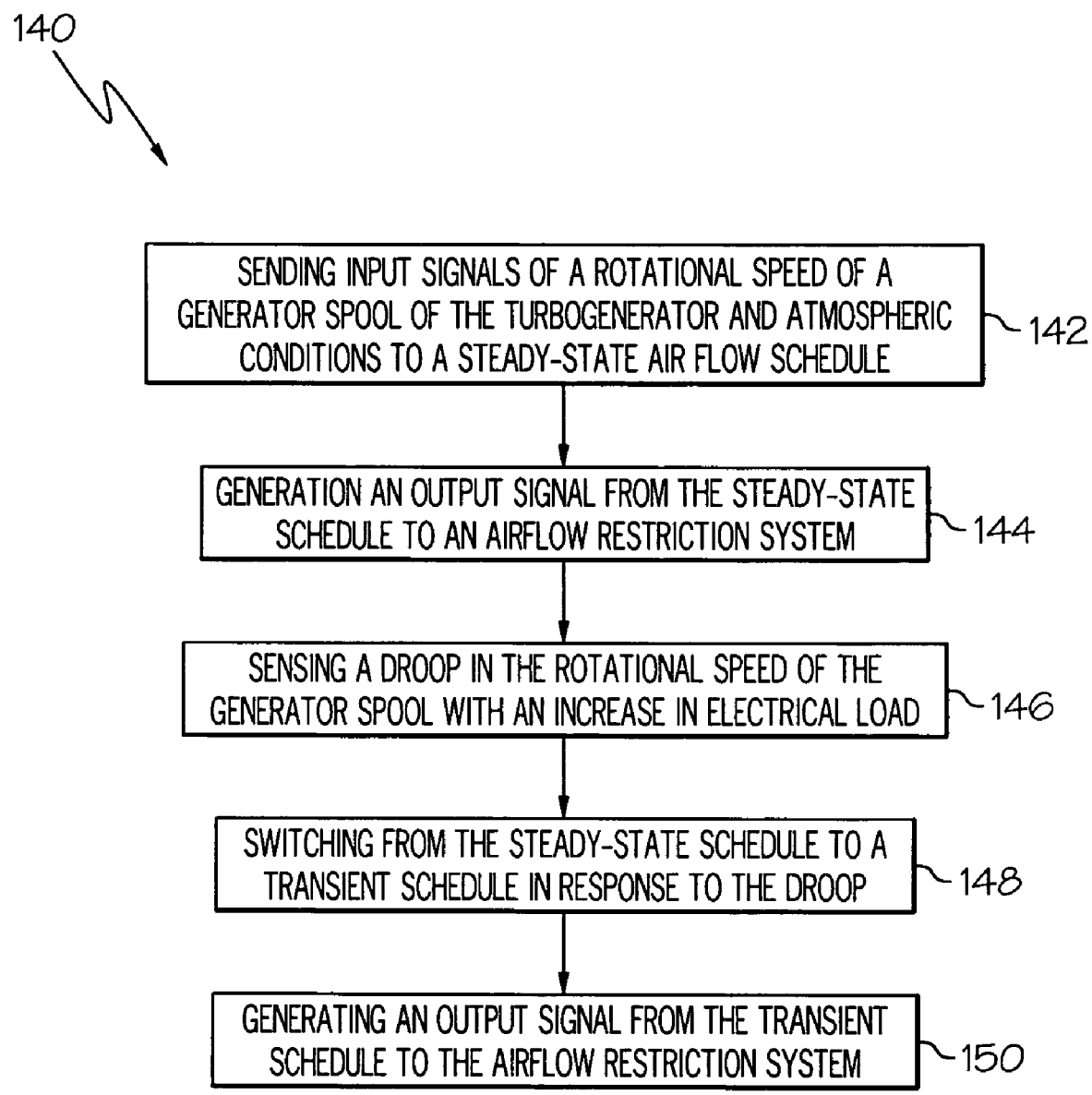
FIG. 14 is a flow chart of a dual-schedule feedback method for controlling the frequency output of a turbogenerator according to the present invention.

A method 140 for a dual-schedule feedback method for controlling the frequency output of a turbogenerator is also provided. Method 140, illustrated in FIG. 14, may comprise the steps of 142 of sending input signals of a rotational speed of a power turbine spool of the turbogenerator and atmospheric conditions to a steady-state air flow schedule and step 144 of generation of an output signal from the steady-state schedule to an airflow restriction system to restrict air flow through a gas generator spool. Restricting the air flow through the gas generator spool may cause the gas generator spool to rotate at an elevated rate. The gas generator spool may drive the power turbine spool at this steady-state speed generating a steady-state frequency of generator alternating current output. Method 140 may further comprise step 146 of sensing a droop in the rotational speed of the power turbine spool with an increase in electrical load, step 148 of switching from the steady-state schedule to a transient schedule in response to the droop, and step 150 of generating an output signal from the transient schedule to the airflow restriction system to increase air flow through the gas generator spool. The increased air flow decreases the droop in the rotational speed of the power turbine spool.

Although the present invention has been described using a dual spool engine as a non-limiting example, it is contemplated that any engine with compressor variable geometry, including single shaft engines, may be used with the present invention.

It should be understood, of course, that the foregoing relates to exemplary embodiments of the invention and that modifications may be made without departing from the spirit and scope of the invention as set forth in the following claims.

We claim:

1. A method for controlling the frequency output of a turbogenerator having a turbine engine with compressor variable geometry comprising the steps of:
   determining an expected change in electrical load on the turbine engine with respect to a steady-state load; and
   biasing adjustable guide vanes of the turbine engine to an initial bias angle with respect to a steady-state angle in response to the expected change in electrical load, wherein the initial bias angle allows the frequency output to stay above a set minimum level when a change in electrical load on the turbine engine occurs.

2. The method of claim 1 wherein the initial bias angle varies from about −2° to about 50° with respect to the steady-state angle.

3. The method of claim 1 wherein the initial bias angle is about ±10° with respect to the steady-state angle.

4. The method of claim 1 further comprising:
   sensing the change in electrical load in real time; and
   moving the adjustable guide vanes from the initial bias angle to a new angle in response to the change in electrical load.

5. The method of claim 4 wherein the adjustable guide vanes are moved at a slew rate less than or equal to about 38°/sec.

6. The method of claim 1, wherein the adjustable guide vanes are moved in a time of from about 0.1 seconds to about 2.0 seconds.

7. The method of claim 1 further comprising:
   biasing a compressor bleed valve to an initial bias position with respect to a steady-state position.

8. The method of claim 7 wherein the the initial bias position is from about 0% to about 15%.

9. The method of claim 1 wherein the determined change in electrical load one the turbine engine is between about 250 kW and about 600 kW.

10. A method for controlling the frequency output of a turbogenerator comprising the steps of:
    determining an expected change in electrical load on the turbine engine with respect to a steady-state load; and
    biasing a compressor bleed valve of the turbine engine to an initial bias position with respect to a steady-state bias in response to the expected change in electrical load, wherein the initial bias allows the frequency output to stay above a set minimum level when a change in electrical load on the turbine engine occurs.

11. The method of claim 10 wherein the the initial bias varies from about 0% to about 15% with respect to the steady-state bias.

12. The method of claim 10 wherein the compressor bleed valve is a modulating bleed valve.

13. The method of claim 10 wherein the bleed valve is a full-opened/full-close type valve.

14. The method of claim 10 wherein the turbine engine comprises more than one bleed valve.

15. The method of claim 10 wherein the determined change electrical load is between about 250 kW to about 600 kW.

16. A method for controlling the frequency output of a turbogenerator comprising the steps of:
    determining an expected change in the electrical load on the turbine engine with respect to a steady-state load;
    biasing adjustable guide vanes of the turbine engine to an initial bias angle from about 0° to about 20° with respect to a steady-state angle in response to the expected change in electrical load; and
    biasing a compressor bleed valve of the turbine engine to an initial bias position from about 0% to about 15% with respect to a steady-state bias in response to the expected change in electrical load.

* * * * *